Oct. 3, 1967  D. B. PALL ETAL  3,344,923
FILTER UNIT HAVING FILTER ELEMENTS IN SERIES AND IN RESERVE
Filed March 2, 1964  2 Sheets-Sheet 1

Oct. 3, 1967  D. B. PALL ET AL  3,344,923
FILTER UNIT HAVING FILTER ELEMENTS IN SERIES AND IN RESERVE
Filed March 2, 1964  2 Sheets-Sheet 2

United States Patent Office 3,344,923
Patented Oct. 3, 1967

3,344,923
FILTER UNIT HAVING FILTER ELEMENTS IN
SERIES AND IN RESERVE
David B. Pall, Roslyn Estates, and Bernard F. Silverwater, Plainview, N.Y., assignors to Pall Corporation, Glen Cove, N.Y.
Filed Mar. 2, 1964, Ser. No. 348,659
15 Claims. (Cl. 210—90)

ABSTRACT OF THE DISCLOSURE

A filter assembly consisting of a cylindrical housing and two annular filters in end-to-end relation within the housing separated by an annular adapter. The adapter includes pressure responsive means dividing the space outside the filters into separate inlet chambers communicating with the upstream sides of the filters and adapted to open communication between the chambers when the pressure differential across one of the filters increases beyond a predetermined value.

---

This invention relates to filter units having a reserve filter element in series with the primary filter element which does not come into use until the primary filter element in the line of normal fluid flow becomes plugged, and thereafter when in use provides a normal filtrate flow.

In the course of time, every filter element becomes plugged, if allowed to remain in use long enough. Preventive maintenance requires that the filter element be serviced and cleaned or replaced before failure due to plugging, and ordinarily, to furnish flow in the event of emergency plugging before servicing, a reserve by-pass line is provided, with a relief valve arranged to open whenever the pressure differential across the filter element becomes sufficiently high.

Preventive maintenance, obviously, is of great importance in the case of aircraft, since a failure of the filter element due to plugging during flight can hardly be tolerated, in view of the disastrous consequences that may follow. With some fluids, such as Mil-L-7808 lubricating oil, the problem of plugging is particularly acute, since this fluid has a tendency to deposit a varnish on the filter, and in a long flight the hazard of plugging can become very great. A by-pass line is not always desirable, either, since the opening of the by-pass line admits unfiltered fluid into the system with consequential plugging of orifices and fluid passages, and excessive wear of pumps, valves, etc.

In accordance with the instant invention, this problem is resolved by providing a filter unit which includes two filter elements, the second of which is in series with respect to the first and remains in reserve, quite unused, until the first element becomes plugged. Both filter elements can be, but need not be, of the same standard of contaminant removal, and consequently the filtrate flow supplied through the second element after plugging of the first element can be of as high a quality as before. Furthermore, the second or reserve filter element has a useful life expectancy which is more than sufficient under normal operating conditions until the unit can be serviced.

The filter unit of the invention comprises a filter housing having inlet and outlet passages communicating respectively with the exterior of the primary filter element and the interior of the reserve filter element. The reserve filter element is entirely separated from the primary element, in such a manner that normal flow by-passes the second reserve element. A relief valve is interposed in the inlet passage, and is adapted to open at a predetermined pressure differential between the inlet and outlet passages across the primary filter element, and when opened opens a direct line from the inlet passage to the reserve filter element, by-passing the primary filter element. Thus, whenever the primary filter element becomes plugged, the relief valve opens, admitting fluid flow from the inlet to proceed to and through the reserve filter element, whence it can proceed to the outlet passage, and thereafter resume the normal line of filtrate flow in the system.

Figure 1:
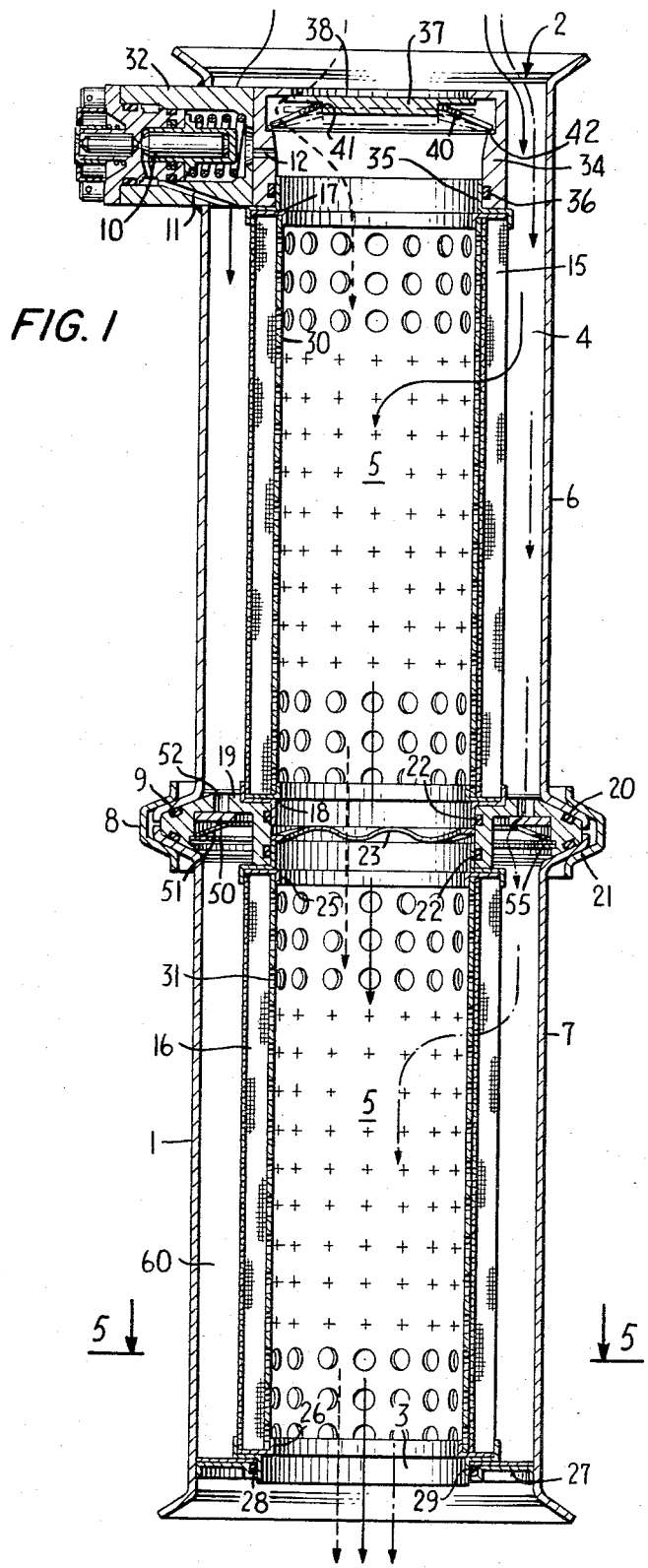
FIGURE 1 is a longitudinal view in section of an in-line or series filter unit in accordance with the invention, taken along the line 1—1 of FIGURE 4.

The filter unit of FIGURES 1 to 5, inclusive, comprises a tubular housing 1, made of aluminum alloy, but which can be made of any metal or plastic material, having an inlet port 2 leading to space 4 and outlet passage 5 and an outlet port 3. The housing can be made in one piece, but as shown, for convenience of access to the interior, is made in upper and lower sections 6 and 7, respectively, held together by V-ring clamp 8. The O-rings 9 ensure a fluid-tight seal therebetween.

At the top of the housing is a differential pressure indicator 10, which can be of any desired type, but which as shown is of the magnetic type described and claimed in U.S. Patent No. 2,942,572. Fuid connections to the flow passages of the housing are provided by passages 11 and 12, leading from space 4 and outlet passage 5, respectively, so as to enable the pressure indicator to respond to pressure differences between the two passages, and thus to detect and indicate whenever the pressure differential between the two passages across either of the filters in the unit exceeds a predetermined minimum. The pressure differential at which the indicator gives a signal is arranged in conjunction with the opening of the passages leading to the reserve filter element 16, as will be apparent from the ensuing discussion.

Figure 5:
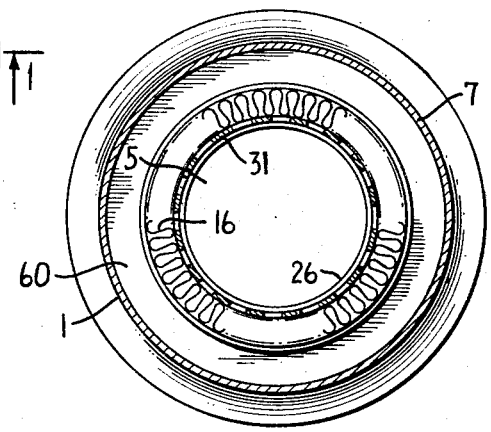
FIGURE 5 is a cross-sectional view through the filter unit of FIGURE 1, taken along the plane 5—5 and looking in the direction of the arrows.

Disposed in the housing 1 are an upper filter element 15 and a lower filter element 16 in series therewith. The upper element 15 is the primary filter element, and is employed in normal flow. The lower filter element 16 is the reserve filter element, and is kept in reserve, quite unused, until the primary element 15 has become plugged, or fails to permit flow through in sufficient volume for some other reason. As shown, both filter elements are identical, and are in fact interchangeable, but this is not a prerequisite. They are made of wire mesh, as shown in the drawing, and are corrugated, as is best seen in FIGURE 5. Sintered wire mesh is employed, made as described and claimed in U.S. Patents Nos. 2,925,650 and 3,049,796, but any filter medium can be used for either element such as unsintered mesh, paper, glass fiber mat, or cloth, sintered metal powder filters such as the porous stainless steel of U.S. Patent No. 2,554,343, resin-impregnated or coated paper, porous plastic, sintered polytetrafluoroethylene, sintered polyethylene, and ceramic filters.

Figure 2:
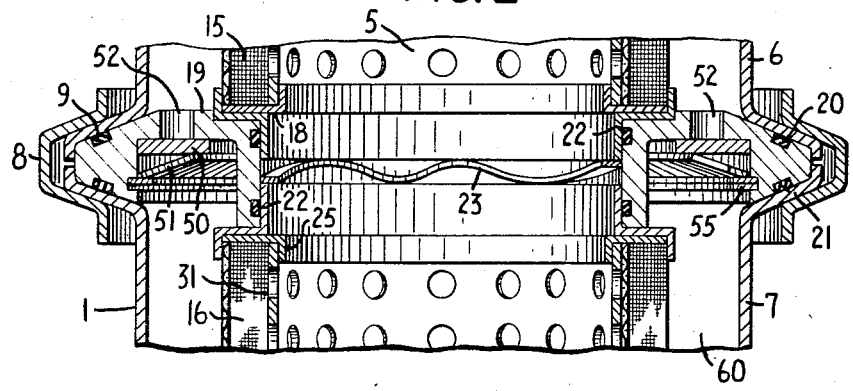
FIGURE 2 is an enlarged view of the lower portion of the primary filter element and upper portion of the reserve filter element of FIGURE 1, showing the means of separation of the two in the unit, so that the line of normal filtrate flow from the primary element by-passes the reserve element.

The corrugated filter mesh and core 30 of the upper element 15 are bonded to upper and lower end caps 17 and 18. The lower end cap 18, as is best seen in FIGURE 2, rests upon the insert or adapter ring 19, which is securely held between housing portions 20 and 21 by V-ring clamp 8, for proper placement and support of the upper filter element 15 in the housing. For this purpose, the lower cap 18 has a downwardly extending inner flange fitting snugly against ring 19, and a fluid-tight seal therebetween is ensured by O-ring 22. Caps 17 and 18 also have inwardly extending flanges so dimensioned as to confine the core 30 and corrugations of the mesh element 15 within the space available in the housing.

The corrugated filter mesh and core 31 of the lower element 16 are bonded to upper and lower end caps 25 and 26, respectively.

The lower portion of the lower housing 7 is provided with an inwardly turned horizontal flange 27 ending in a stepped ledge 28, capturing an O-ring 29 between it and lower end cap 26 of the lower element. The flange 27 serves as a support for the reserve filter element 16. O-ring 29 ensures a fluid-tight seal between the flange 27 and the end cap 26.

Each of the end caps 17, 18, 25 and 26 is provided with a central aperture communicating the central open area enclosed by the primary and reserve filter elements 15 and 16, and together constituting the central passage 5.

Both of filter elements 15 and 16 have internal support in the form of cylindrical perforated cores 30 and 31, respectively, made of stainless steel, but any structural metal can be used. Any other suitable support can be used, such as a metal spring, a perforated cardboard tube, and the like.

The wave form spring 23 acts as an antivibration device biasing the elements 15 and 16 against the relief valve housing 34 and housing flange 27, respectively.

It will be seen in FIGURE 1 that the pressure indicator housing 32 and relief valve housing 34 are bonded together and welded to the housing. End cap 17 has an upwardly extending flange 35 over which the relief valve housing 34 fits, with O-ring 36 furnishing a fluid-tight seal therebetween. The top of housing 34 is closed by the valve plate 37, held firmly against the periphery of opening 38 by the Belleville disc 40. This disc is preferably, but not necessarily, of the serrated or finger type, so as to give a large opening for full flow volume through at a low pressure drop in a small space. The inner periphery of disc 40 engages a stepped portion 41 of the valve plate 37, and the outer periphery engages the stepped portion 42 of housing 34. Housing 34, valve plate 37 and Belleville spring disc 40 serve as a relief valve assembly to control flow from the inlet port 2, bypassing both filter elements 15 and 16. As is evident from FIGURE 1, the disc 40 is adapted to flex or snap downwardly and move valve plate 37 downwardly to communicate opening 38 with passage 5 whenever the pressure differential therebetween reaches a predetermined minimum.

The valve plate 37 when in a closed position, shown in FIGURE 1, provides a barrier to fluid flow between the inlet port 2 and the outlet port 3 bypassing the primary and reserve filter elements. Consequently, in this position all fluid (except for valve leakage) flowing through inlet port 2 is directed into the passage 4 between the inner wall of the housing 6 and the outside of the primary filter element 15. The normal line of such fluid flow is shown in the solid line.

A relief valve assembly held in place by housing flanges 20, 21 comprises the adapter 19, and an annular valve plate 50 supported by a Belleville spring disc 51 against a plurality of ports 52 in the upper portion of the adapter. This disc is preferably but not necessarily of the serrated or finger type, so as to give a large opening for full flow volume through at a low pressure drop in a small space. The outer periphery of the spring 51 is retained by a spirolox retaining ring 55 fitting in a groove in the adatper 19, and the inner periphery supports the valve 50 tightly against the lower face of the ports 52 in a fluid-tight seal. When in the closed position, shown in FIGURES 1 and 2, inclusive, the valve 50 closes off port 52 and prevents flow of fluid from space 4 outside filter element 15 to space 60 outside filter element 16. Hence, when the valve plate 50 is in the closed position, fluid entering at inlet port 2 and passing into space 4 can only proceed by passing through the filter 15 into passage 5.

Figure 3:
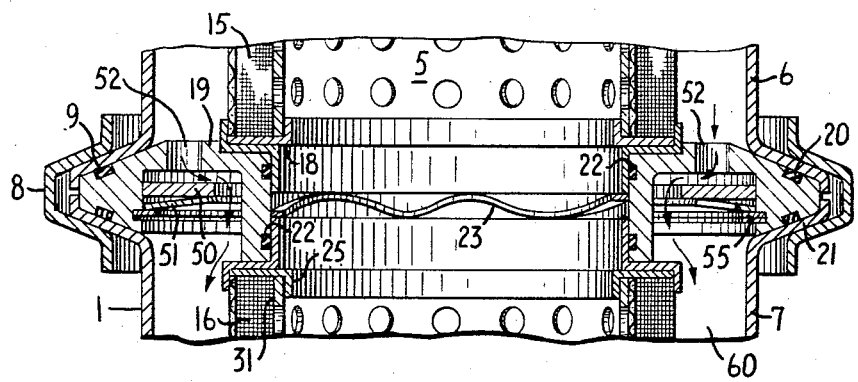
FIGURE 3 is an enlarged view of the upper portion of the primary filter element and lower portion of the reserve filter element of FIGURE 1, showing the line of emergency or reserve flow when the primary filter element is plugged and the relief valve has opened, to allow flow to proceed through the reserve element.
Figure 4:
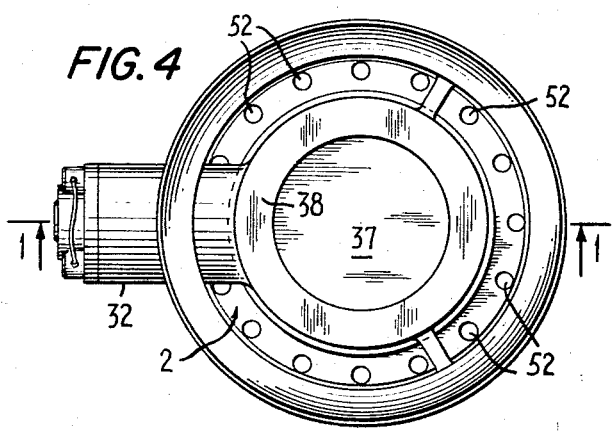
FIGURE 4 is a top view of the filter unit of FIGURE 1.

When the valve plate 50 is in the open position, however, shown in FIGURE 3, the fluid is free to enter the space 60 between the inside of the housing 7 and the outside of reserve filter element 16. As is evident from FIGURES 1 and 3, the valve 50 is adapted to flex or snap downwardly whenever a predetermined pressure differential is exceeded between the space 4 and space 60, which communicates through the reserve filter element to the passage 5. The resulting reserve line of fluid flow is shown in the dashed line.

The operation of the filter is as follows. Normal flow of fluid to be filtered (shown in solid line) enters the filter head at inlet port 2, enters the space 4, whence it flows through the primary filter element 15 and core 30. The filtrate thence enters the central passage 51 and leaves the filter unit at the outlet port 3.

The flow continues in this way until the primary filter element 15 becomes plugged, due, for example, to the development of a deposit or varnish on the filter surface. When the primary filter element becomes plugged, the pressure in outlet passage 5 and thus space 60, with which it communicates via reserve filter element 16, drops to considerably less than the pressure in space 4, and the differential pressure required to open the valve 50 is exceeded, and the valve opens. When the valve has opened, the flow of fluid then continues, but now it passes the valve 50 and enters the space 60 on the outside of the reserve filter element 16, which it then flows through, emerging via core 31 into the central passage 5 as before, and leaves the filter unit via port 3. Thus, a normal filtered flow is maintained, despite the plugging of the primary filter element.

The pressure indicator 10 is arranged to give a signal indicating plugging of the primary reserve element at a pressure differential thereacross a little less than or the same as that at which the valve plate 50 opens, so as to advise the operator reserve-filtered flow has begun, and that the primary and preferably reserve elements must be replaced. This will give the operator sufficient time to take appropriate servicing action before failure of the reserve element.

The indicator also can be set to give a signal only when both the primary and reserve elements are plugged, and bypass flow begun, by setting it to be actuated at a pressure differential across the primary element a little less than that at which valve 37 is set to open.

If for any reason this pressure differential should be exceeded, the valve plate 37 will open and allow flow to by-pass both the filter elements. Thus, neither the primary nor the reserve filter element need withstand any pressure differential beyond that which allows full flow through the valve plate 37, which thus acts as a safety valve to protect both the filter elements against excessive differential pressures.

It will of course be understood that any type of filter element can be employed for the primary and reserve filter elements, as the system may require. Furthermore, the filter element need not be in corrugated form, although this is desirable because higher dirt capacity and higher filtrate flow rate result from the greater surface area of the element, thus providing a greater surface area for flow through in a small envelope.

Any type of relief valve can be used in place of the Belleville spring-biased valve, although the latter is preferred. Thus, a poppet and spring type valve can also be used.

The Belleville spring used to bias the valves of the invention is in the form of a disk bowed against the direction of flow and which opens fully at a pre-determined pressure differential. The flow-through required is provided by so dimensioning the disk and valve plate as to give an annular opening of the predetermined flow capacity when the valve cracks open. Disk thickness, amount of bow, disk diameter and annular opening diameter are determined by the pressure differential to be resisted, i.e., the resistance to be offered by the spring action of the disk, and the flow capacity needed at a given pressure differential. Preferably, the inner periphery of the disk is serrated or fingered, for maximum size of opening in a small space. However, conventionally circularly apertured disks can also be used.

The spring disk of the invention is made of material of high yield strength and high hardness. Materials having minimum yield strengths of 30,000 to 250,000 p.s.i.g., can be used, with Rockwell hardness of the order of C–45. Steel, stainless steel, and nickel chromium alloys are satisfactory, as also are certain synthetic resins such as polytetrafluoroethylene and polyoxymethylene. Metal spring disks of the desired type are available, and are known as Belleville washers.

The disk can be uniform in thickness throughout or can vary in thickness, thinner at the center than at the edge, to give improved flexing and sealing.

Fluid flow conditions of all kinds can be met by appropriate design of the spring disk to any load-deflection characteristics required in the system. The geometry of these disks is established by the disks' outside diameter and inside diameter, its free height measured from the inside edge (along the perpendicular to the outside edge) and its thickness. Proper selection of the geometry, using mathematical tables and equations of Fortini, Machine Design, Sept. 4, 1958, "Conical-Disc Springs" will give a valve capable of pressure-relieving response to any type of load in any desired way. The valve plates 37 and 50 as well as the seats can if desired be coated with plastic or resilient material to aid sealing.

The following is claimed:

1. A filter assembly comprising, in combination, a housing having an inlet and an outlet; and, disposed in the housing, a primary filter element to receive flow from the inlet; a reserve filter element adjoining the primary filter element in a consecutively endwise position with respect to the primary filter element; separating means extending from the juncture of the primary and secondary filter elements to the housing, and dividing the housing into at least two inlet flow chambers including a primary inlet flow chamber and a reserve inlet flow chamber, the primary flow chamber opening onto the upstream side of the primary filter element, and the reserve flow chamber opening onto the upstream side of the reserve filter element, said separating means normally closing off the reserve flow chamber from the inlet and thus isolating the upstream side of the reserve filter element from inlet flow; and a relief valve associated with the separating means and responsive to a predetermined pressure differential across the primary filter element to open and permit flow to proceed into the reserve flow chamber, thus to expose the upstream side of the reserve filter element to flow from the inlet, and to permit flow to continue to the outlet via the reserve filter element.

2. A filter assembly in accordance with claim 1, including a second relief valve set to open at a predetermined pressure differential across the reserve filter element to permit flow to bypass both the primary and the reserve filter elements whenever the reserve filter element also becomes obstructed and the predetermined pressure differential thereacross is exceeded.

3. A filter assembly in accordance with claim 1, in which the relief valve is in the form of a spring disk valve.

4. A filter assembly in accordance with claim 1, in which the primary and reserve filter elements are cylindrical and interchangeable, and are disposed in a tubular housing.

5. A filter assembly in accordance with claim 1, in which the separating means is an annulus.

6. A filter assembly in accordance with claim 5, including a differential pressure indicator for detecting and indicating a pressure differential across at least the primary filter element greater than a predetermined minimum.

7. A filter assembly in accordance with claim 1, in which the primary and reserve filter elements are substantially identical.

8. A filter assembly in accordance with claim 1, in which the primary and reserve filter elements are made of paper.

9. A filter assembly in accordance with claim 1, wherein the primary and secondary filter elements are made of wire mesh.

10. A filter assembly in accordance with claim 9, wherein at least one of the filter elements is made of sintered wire mesh.

11. A filter assembly comprising a generally tubular housing having an inlet and an outlet; and, disposed in the housing, a primary filter element placed in proximity to the inlet; a reserve filter element adjoining the primary filter element in a consecutively endwise position, the two filter elements together enclosing an open common central passage communicating with the outlet, an annular separating member extending from the juncture of the primary and reserve filter elements to the housing and forming with the housing at least two chambers, a primary inlet flow chamber and a reserve inlet flow chamber, the primary inlet flow chamber enclosing the upstream side of the primary filter element, and the reserve inlet flow chamber enclosing the upstream side of the reserve filter element; support means supporting the reserve filter element in the housing, and forming with the housing a portion of the reserve flow chamber, such that the support means, the housing and the separating member define a normally closed reserve flow chamber about the upstream side of the reserve filter element; and a relief valve associated with the separating member and responsive to a predetermined pressure differential across the primary filter element, to open and expose the upstream side of the reserve filter element to inlet flow, whereby whenever the predetermined pressure differential across the primary filter element is exceeded, the relief valve opens and filtered flow can continue via the reserve filter element to the outlet.

12. A filter assembly in accordance with claim 11, including a second relief valve set to open at a predetermined pressure differential across the reserve filter element to permit flow to bypass both the primary and the reserve filter elements whenever the predetermined pressure differential thereacross is exceeded.

13. A filter assembly in accordance with claim 11, in which the filter elements are substantially identical, and in which the annular separating member comprises an annular adapter coupling the primary and secondary filter elements together.

14. A filter assembly in accordance with claim 13, in which the tubular housing is formed in two substantially identical sections.

15. A filter assembly in accordance with claim 13, in which the annular adapter is provided with an aperture which is normally closed off by an annular disk valve.

References Cited

UNITED STATES PATENTS

| | | | |
|---|---|---|---|
| 2,870,914 | 1/1959 | Bloch | 210—323 X |
| 3,216,571 | 11/1965 | Whiting et al. | 210—132 X |
| 3,224,583 | 12/1965 | Rosaen | 210—132 X |
| 3,246,920 | 4/1966 | Pall | 210—232 X |
| 3,262,563 | 7/1966 | Pall | 210—90 |
| 3,262,564 | 7/1966 | Pall et al. | 210—132 X |
| 3,269,540 | 8/1966 | Rosaen | 210—132 |

SAMIH N. ZAHARNA, *Primary Examiner.*